United States Patent
Eichholz et al.

(10) Patent No.: US 9,411,981 B2
(45) Date of Patent: Aug. 9, 2016

(54) METHOD AND SYSTEM FOR ACTIVATING A PORTABLE DATA CARRIER

(75) Inventors: Jan Eichholz, Munich (DE); Gisela Meister, Munich (DE); Henning Daum, Munich (DE)

(73) Assignee: GIESECKE & DEVRIENT, Munich (DE)

( * ) Notice: Subject to any disclaimer, the term of this patent is extended or adjusted under 35 U.S.C. 154(b) by 0 days.

(21) Appl. No.: 13/394,006

(22) PCT Filed: Sep. 1, 2010

(86) PCT No.: PCT/EP2010/062784
§ 371 (c)(1),
(2), (4) Date: Mar. 2, 2012

(87) PCT Pub. No.: WO2011/026854
PCT Pub. Date: Mar. 10, 2011

(65) Prior Publication Data
US 2012/0159171 A1    Jun. 21, 2012

(30) Foreign Application Priority Data
Sep. 3, 2009   (DE) .................. 10 2009 040 027

(51) Int. Cl.
*G06F 21/62*   (2013.01)
*H04L 9/32*    (2006.01)
(Continued)

(52) U.S. Cl.
CPC .......... *G06F 21/6245* (2013.01); *G06F 21/445* (2013.01); *G06F 21/606* (2013.01);
(Continued)

(58) Field of Classification Search
CPC . G06F 21/445; G06F 21/606; G06F 21/6245; G06F 21/77; G06F 21/645; G06Q 20/354; G07F 7/1008; H04L 9/3263; H04L 9/3273; H04L 2209/805; G07C 9/00071; G07C 2209/41

USPC ........ 713/168, 169, 171, 183, 186; 455/41.1, 455/41.2; 235/380; 709/203, 219; 705/39–44
See application file for complete search history.

(56) References Cited

U.S. PATENT DOCUMENTS 6,317,832 B1 * 11/2001 Everett et al. ................ 713/172
6,820,802 B2 * 11/2004 Biggar et al. ................ 235/379
(Continued)

FOREIGN PATENT DOCUMENTS

EP          0 479 982 B1    9/1995
EP          1 662 425 A1    5/2006
(Continued)

OTHER PUBLICATIONS

Sixto Ortiz Jr: "Is Near-Field COmmunication close to success?", IEEE Computer Socitey, 60th anniversary, Technology news, Mar. 2006, pp. 19-20.*

(Continued)

*Primary Examiner* — Catherine Thiaw
(74) *Attorney, Agent, or Firm* — Workman Nydegger

(57) ABSTRACT

The invention relates to a method for activating a portable data carrier (1) in which a first portable data carrier (1) is supplied in an inactive state to a user, after the user has requested the first data carrier (1) with the aid of a second portable data carrier (2) from a central instance, whereby the first and the second data carrier (1, 2) have access to authentication data for mutual authentication. In the method according to the invention a communication connection is set up between the first and the second data carrier (1, 2), via which the first and the second data carrier (1, 2) mutually authenticate each other on the basis of the authentication data and establish a cryptographically secured end-to-end connection. Via this end-to-end connection then the second data carrier (2) activates the first data carrier (1) by transmitting activation data to the first data carrier (1).

20 Claims, 1 Drawing Sheet

(51) Int. Cl.
*G06F 21/44* (2013.01)
*G06F 21/60* (2013.01)
*G06F 21/77* (2013.01)
*G06Q 20/34* (2012.01)
*G07C 9/00* (2006.01)
*G07F 7/10* (2006.01)

(52) U.S. Cl.
CPC ............. *G06F 21/77* (2013.01); *G06Q 20/354* (2013.01); *G07C 9/00071* (2013.01); *G07F 7/1008* (2013.01); *H04L 9/3263* (2013.01); *H04L 9/3273* (2013.01); *G07C 2209/41* (2013.01); *H04L 2209/805* (2013.01)

(56) References Cited

U.S. PATENT DOCUMENTS

| | | | | |
|---|---|---|---|---|
| 7,146,159 | B1* | 12/2006 | Zhu | 455/414.1 |
| 7,346,766 | B2* | 3/2008 | Mackin et al. | 713/100 |
| 7,427,926 | B2* | 9/2008 | Sinclair et al. | 340/4.2 |
| 8,095,132 | B2* | 1/2012 | Cheng et al. | 455/435.1 |
| 8,175,529 | B2* | 5/2012 | Wakasa et al. | 455/41.2 |
| 8,391,786 | B2* | 3/2013 | Hodges et al. | 455/41.2 |
| 2002/0130187 | A1* | 9/2002 | Berg et al. | 235/492 |
| 2002/0174016 | A1 | 11/2002 | Cuervo | 705/16 |
| 2003/0183691 | A1* | 10/2003 | Lahteenmaki | G06K 7/0008 235/441 |
| 2003/0228886 | A1* | 12/2003 | Ishii et al. | 455/558 |
| 2004/0025021 | A1* | 2/2004 | Aikawa et al. | 713/172 |
| 2004/0030896 | A1* | 2/2004 | Sakamura et al. | 713/169 |
| 2004/0030898 | A1* | 2/2004 | Tsuria et al. | 713/171 |
| 2005/0096087 | A1* | 5/2005 | Kim | 455/558 |
| 2005/0272371 | A1* | 12/2005 | Komatsuzaki et al. | 455/41.2 |
| 2005/0279826 | A1* | 12/2005 | Merrien | 235/380 |
| 2006/0025177 | A1* | 2/2006 | Tu | 455/558 |
| 2006/0118620 | A1* | 6/2006 | Hosogoe | 235/380 |
| 2007/0026797 | A1* | 2/2007 | Borjeson et al. | 455/41.2 |
| 2007/0226793 | A1 | 9/2007 | Tanabiki et al. | |
| 2007/0245154 | A1* | 10/2007 | Akkermans et al. | 713/186 |
| 2007/0264976 | A1* | 11/2007 | Lessing | H04W 88/06 455/414.1 |
| 2007/0291995 | A1* | 12/2007 | Rivera | 382/115 |
| 2008/0257959 | A1* | 10/2008 | Oved | 235/380 |
| 2009/0137205 | A1* | 5/2009 | Ketwich et al. | 455/41.2 |
| 2009/0164799 | A1* | 6/2009 | Takagi | 713/186 |
| 2009/0175323 | A1* | 7/2009 | Chung | H01L 23/48 375/220 |
| 2009/0206165 | A1* | 8/2009 | Laackmann | G06K 19/0707 235/492 |
| 2009/0276626 | A1* | 11/2009 | Lazaridis et al. | 713/168 |
| 2009/0307491 | A1* | 12/2009 | Nakatsugawa et al. | 713/169 |
| 2010/0090000 | A1* | 4/2010 | Varone et al. | 235/382 |
| 2011/0117839 | A1* | 5/2011 | Rhelimi | 455/41.1 |

FOREIGN PATENT DOCUMENTS

| | | |
|---|---|---|
| WO | 2004/027715 A2 | 4/2004 |
| WO | 2004/105421 A2 | 12/2004 |
| WO | 2008/000297 A1 | 1/2008 |

OTHER PUBLICATIONS

Dirk Balfanz, Glenn Durfee, Rebecca E. Grinter, D.K. Smetters, Paul Stewart: "Network-in-a-box: How to set up a secure wireless network in under a minute", 13th USENIX Security Symposium, Aug. 2004.*
ISR in PCT/EP2010/062784, Dec. 1, 2010.

* cited by examiner

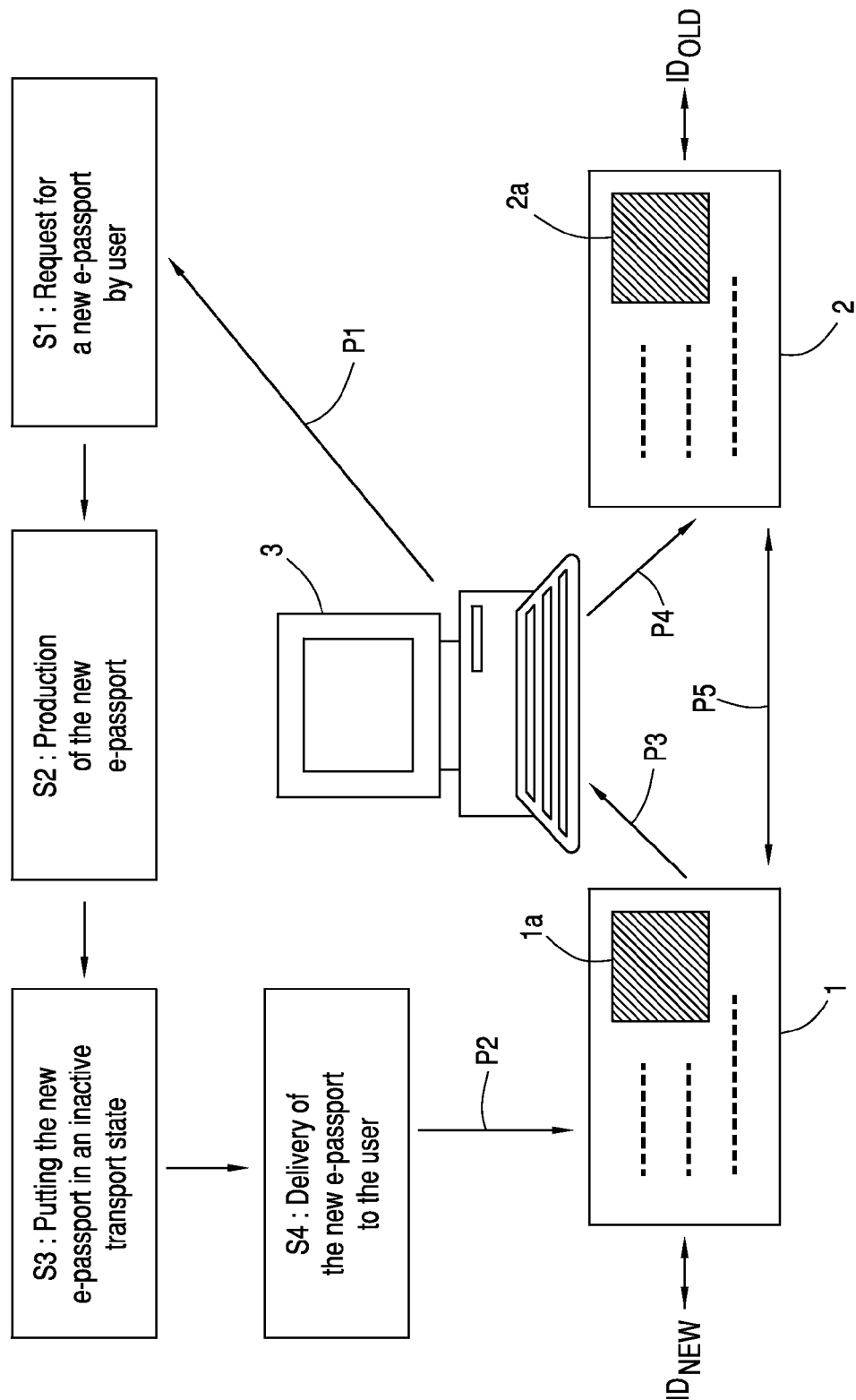

METHOD AND SYSTEM FOR ACTIVATING A PORTABLE DATA CARRIER

BACKGROUND OF THE INVENTION

A. Field of the Invention

The invention relates to a method and a system for activating a portable data carrier, e.g. in the form of a chip card.

B. Related Art

Today in a plurality of applications portable data carriers are used that are personalized for a predetermined person and are provided solely for the use by this person. On such data carriers frequently highly sensitive personal data of the user are saved. So as to prevent misuse, it must therefore be ensured that the personalized data carrier is handed over to that user for whom the data carrier was personalized. Thus for example when requesting portable data carriers in the form of electronic identity documents, such as e.g. an electronic passport, as a rule it is required that the applicant appears in person when requesting and having issued the electronic identification document.

In the document WO 2004/027715 A2 a system for personalizing and issuing identity documents is described in which a document can be personalized in a decentralized fashion, via a personalization unit. Here in the personalization process a central supervisory instance is interposed with which the personalization unit communicates for authorizing the personalization of a document. Thus a data connection must be set up between the personalization unit and the central instance for carrying out the personalization.

In the document EP 0 479 982 B1 the transfer of monetary values between portable data carriers in the form of electronic wallets is described, whereby the transfer of a monetary value can take place directly between the wallets without interposing a computer system.

From US 2007/0226793 A1 a method is known for transferring security functionality from a "parent card" to a "child card". The parent card receives from a certification authority a certificate with the public key of the certification authority. The parent card itself further generates a certificate that is stored in the child card. The certificate generated by the parent card contains a signature formed with the aid of the secret key of the parent card over the public key of the child card; in addition it contains the basic certificate issued by the certification authority. By resolving the nested certificate of the parent card the child card can be traced back uniquely to the parent card and be authenticated thereby. After successful authentication the card issuer transfers authorization data to the child card with which the child card can subsequently be used like a parent card. The nesting method can be continued in principle over any desired number of card generations. The formation of the nested certificates and the transfer of card functionalities take place at an intermediary device at which the parent card and the child card are presented simultaneously. Doing so, a secure connection is set up between the parent card and the child card. After establishing the secure connection between the parent card and the child card the method requires the inclusion of the card issuer.

It is the object of the invention to create a method and a system for activating a portable data carrier which make it possible to activate the data carrier without the direct involvement of a central instance in a simple, secure and user-friendly fashion.

SUMMARY OF THE INVENTION

In the method according to the invention a first portable data carrier is supplied in an inactive state to a user after the user has requested the first data carrier from a central instance with the aid of a second portable data carrier. An inactive state is to be understood as such a state in which an intended use of the portable data carrier is not possible. In particular it is ensured in the inactive state that the data already stored on the portable data carrier cannot be read out and/or copied by unauthorized third parties. A central instance in the sense of the invention represents an institution such as e.g. an authority that is authorized to issue the corresponding data carrier. When the method is used for example for activating a new electronic identification document, this central instance is in particular the corresponding government authority authorized to issue electronic identification documents.

In the method according to the invention the first and the second data carrier have access to corresponding authentication data for mutual authentication. Herein these authentication data are stored preferably directly on the first and the second portable data carrier. For activating the first data carrier, according to the invention first a communication connection between the first and the second data carrier is set up, via which the first and the second data carrier mutually authenticate each other on the basis of the authentication data and establish a cryptographically secured end-to-end connection. Via this cryptographically secured end-to-end connection it is ensured that the data transferred thereover can be processed only by the first and the second data carrier and cannot be read out and/or processed by any third parties. Via the end-to-end connection then the second data carrier activates the first data carrier by transmitting activation data to the first data carrier.

The method according to the invention is characterized in that, without the interposition of a further instance, a user can activate the first data carrier supplied to him through a direct data transfer with the aid of the second data carrier. By using a cryptographically secured end-to-end connection sufficient protection against manipulations is achieved while doing so. Thereby a simple activation of a requested first data carrier can be ensured, without the user having to appear in person before the central instance where he requested the first data carrier. In particular the first data carrier to be activated can be sent directly to the user. Since the first portable data carrier is inactive at first, thereby also any manipulations are prevented during the transport of the first data carrier to the user.

The method according to the invention can be employed for activating any desired portable data carriers. A preferred application case is the activation already mentioned above of electronic identification documents, such as e.g. electronic personal identification cards or passports. However, the method can also be employed for activating electronic visa, electronic tickets or electronic health cards. Likewise with the method also electronic bank cards, such as e.g. a credit card or a different type of bank card, can be activated.

In a particularly preferred embodiment of the method according to the invention it is not even required that the user has to appear in person when requesting the first data carrier before the central instance issuing the data carrier. Rather, also an online request, in particular via the Internet, can be provided. During the online process then corresponding data of the second data carrier are read or input by the user, so that it is ensured that the suitable authentication data are stored on the first data carrier for carrying out the later authentication.

In a further embodiment of the method according to the invention the supplied first data carrier can be optically and/or electronically personalized already at least partly. For example when requesting a new electronic identification document an optical personalization already can take place to the effect that personal data such as name, address, date of birth and the passport photograph of the user are printed on the identification document.

In a further embodiment of the method according to the invention the communication connection set up between the first and the second data carrier is a local communication connection in the user's area of influence, in particular with the interposition of a local computer. In this fashion it is in particular made possible that a user can activate the first data carrier through his computer from home. In a particularly preferred variant here a corresponding local software for carrying out the activation is stored on the computer of the user. This software is preferably freely available via the Internet and can be downloaded by the user onto his computer for carrying out the activation.

The mutual authentication of the first and the second data carrier can take place with different methods, which are known per se from the state of the art. For example a symmetric authentication with a symmetric key can be employed, in which in each data carrier a symmetric key is stored or each data carrier has access to such a key. The authentication is successful when the symmetric keys of both data carriers are consistent with each other. Where applicable, the mutual authentication can also take place on the basis of an asymmetric method, in which for authentication an asymmetric pair of keys consisting of a private and a public key is used. The private key therein is preferably stored on the first data carrier, and the second data carrier has access to the corresponding public key allocated to the private key.

So as to further increase the security of the method regarding unauthorized use through a third party, in a preferred variant of the method according to the invention the setup of the communication connection is preceded by a user authentication, in particular via a password and/or biometric data. Such biometric data can in particular comprise the user's fingerprint, which is read via a corresponding reader.

The activation data which, for the purpose of activation of the first data carrier, are loaded onto that data carrier, can be designed as desired. In an embodiment of the invention the activation data comprise personalization data to be stored on the first data carrier, i.e. the supplied first data carrier is not yet comprehensively personalized in the inactive state. Such data can comprise in particular biometric data, such as e.g. fingerprints, or also any desired other person-specific data, such as e.g. medical data or prescriptions of the user. Possibly the activation data can also comprise data that are not immediately person-specific, such as e.g. cryptographic keys and/or electronic certificates. In a further variant the activation data can also comprise only a password to be input by the user, which was communicated to the user in advance by secured means and is also stored on the first data carrier. According to the invention also combinations of the mentioned data can be used as activation data, whereby the activation of the first data carrier takes place only in the case that all activation data are transmitted to the first data carrier.

In a further, particularly preferred embodiment of the method according to the invention an unauthorized use of the second data carrier after the activation of the first data carrier is prevented. This is achieved in that after the activation of the first data carrier the second data carrier becomes inactive automatically.

Besides the above-described method the invention further relates to a system for activating a portable data carrier, with the system comprising a first and a second portable data carrier, which are designed in such a fashion that every variant of the method according to the invention can be carried out with these two data carriers.

BRIEF DESCRIPTION OF THE DRAWINGS

An embodiment of the invention will be described in detail subsequently with reference to the enclosed FIG. 1. This FIGURE shows a schematic representation of the process of an execution of the method according to the invention.

DETAILED DESCRIPTION OF PREFERRED EMBODIMENTS

In FIG. 1 an example of the invention is shown in which a user requests a new so-called e-passport (electronic passport) and activates it with his old electronic passport. An electronic passport here contains a corresponding semiconductor chip with personalized data of the user saved on it, for example biometric data such as e.g. fingerprints. An electronic passport in this sense represents an embodiment of a portable data carrier in the terminology of claim 1. However, the invention is not limited to electronic passports, but can also apply to any desired other portable data carriers, in particular data carriers limited in resources, i.e. data carriers which have either no user interface at all or only a rudimentary one with corresponding input and output means, and which do not have their own full energy supply enabling a self-sustaining normal operation. Limited-resource data carriers of this type are e.g. also identification documents of any kind, health-insurance cards, bank cards (e.g. EC or credit cards) and the like.

In the embodiment of FIG. 1 a user makes an online request via a local PC 3 from home for a new e-passport from a corresponding registration authority, as indicated by step S1 and the arrow P1. The PC 3 of the user here is connected with the Internet, and the user goes to the corresponding site of the registration authority to request a new passport there. For this purpose he enters corresponding data suitable for identification or data suitable for personal allocation from his old e-passport, which is designated by the reference numeral 2 in FIG. 2 and is optically personalized i.a. with a corresponding image 2a of the user. Further to the passport 2 a unique identity $ID_{OLD}$ is allocated and the passport 2 supports a mechanism for secure identification, for example the EAC identification (EAC=extended access control) known from the state of the art.

After concluding the online request at the registration authority the production of the new e-passport is initiated, which is finally produced in a corresponding production plant in step S2; the new passport bears the reference numeral 1 in FIG. 1. In a first embodiment of the invention the new passport 1 is physically completely prefabricated and optically personalized analogously to the old passport, for example with an image 1a of the user. The new passport 1 is pre-personalized electronically in that the IC is equipped with the required basic functionalities and the personalization structures are built. Expediently also a part of the personalization data, for example inalterable data such as the name of the user, are already inscribed in the IC. At least some data, e.g. alterable data such as the address, subsequently added functionalities or keys, are not yet entered within the framework of the production, or are entered only in a locked form. The new passport 1 further has a unique identity $ID_{NEW}$, which is preferably also stored in the IC. Further in the IC cryptographic keys are stored, with which later on the activation of the new passport 1 can take place, as well as possibly expediently also such cryptographic keys with which the new passport 1 itself can take on the role of an old passport at a later time, if required, so as to activate a further new passport then.

After concluding the production the new electronic passport in step S3 is put in a so-called transport condition that corresponds to an inactive state in the sense of claim 1. In this state the electronic functionalities of the electronic passport are put out of function and the passport must be activated before its first use. This activation takes place with the aid of the old passport 2 used in the request, as will be described in greater detail in the following.

The new passport 1 is then directly delivered to the user at home, which is indicated by step S4 and a corresponding arrow P2. It is thus no longer necessary for the user to collect the passport in person, for example from a central registration authority. Likewise in the online request described in FIG. 1 the user does not need to appear in person before the registration authority to request the new passport.

As mentioned above, the user must activate the new passport 1 in a suitable fashion to be able to employ it for identification purposes. The activation here takes place in such a fashion that corresponding activation data are transferred from the old passport 2 directly to the new passport 1. In a preferred embodiment these activation data are personalization data, such as e.g. biometric data of the user, which were not yet stored in the new passport 1 during production. For activation it is required that the two passports 1 and 2 authenticate each other, so as to ensure by doing so that only the old passport 2 can carry out the activation of the new passport 1. To make this authentication possible authentication data are applied to the new passport 1 during the production of the new passport 1. The old passport 2 therein is prepared correspondingly, so that with the authentication data exclusively an authentication between the new passport 1 and the old passport 2 is possible. This means that also old passport 2 contains suitable authentication data or has access to such data so as to ensure an exclusive authentication with the new passport.

In an embodiment of the method according to the invention an asymmetric authentication takes place between the new passport 1 and the old passport 2. In this case the new passport contains a secret private key and an authorization certificate which it employs, when operated normally, upon the so-called terminal authentication of the EAC procedure. To the secret private key a corresponding public key is allocated, which is stored on the old passport or which is supplied to the old passport via a corresponding PKI infrastructure (PKI=public key infrastructure) by a certification authority. With the aid of the private key of the identity $ID_{NEW}$ and the corresponding public key then the authentication takes place with a method known from the state of the art, such as e.g. a challenge-response procedure. Instead of an asymmetric authentication alternatively also a symmetric authentication can take place on the basis of a symmetric key. The symmetric key here is stored on the new passport 1 and also known to the old passport 2. In particular the symmetric key is also saved on the old passport 2.

By checking the consistency between the symmetric keys in this fashion a mutual authentication can take place likewise.

The storing of the keys for the authentication on the old passport 2 can have taken place e.g. within the framework of its production or in the process of establishing contact with a registration authority, for example also within the framework of requesting the new passport.

In the embodiment described here the new passport 1 in its inactive transport state merely permits carrying out the following two secure-messaging commands:
1. PSO: ENCIPHER
2. PSO: COMPUTE CC These commands are known per se from the state of the art and therefore are not explained in greater detail.

For activating the new passport 1 the user establishes a local connection via a host to the new passport 1, as indicated by the arrow P3. The host can in particular also be a conventional PC 3, but can also have the form of networked apparatus. The host can then e.g. be a publicly accessible terminal. At the PC of the user, which is in the following always taken as a basis, a corresponding local communication interface is provided which can for example be of a wireless design and be based on near-field communication (NFC). In the same fashion a local connection is established between the old passport 2 and the PC 3, as indicated by the arrow P4. As condition to be fulfilled for the setup of the connection expediently an authentication of the user is provided, which can be based for example on biometric data or a suitable PIN. Depending on the security requirements the local connections between the passports 1 and 2 and the PC 3 can be secured, e.g. by using the PACE method (PACE=password-authenticated connection establishment) known from the state of the art.

After the establishment of the local connections the mutual authentication already mentioned above between the identity $ID_{OLD}$ of the old passport 2 and the identity $ID_{NEW}$ of the new passport 1 takes place. In the case of the symmetric authentication here the previously agreed symmetric keys are used, and in the asymmetric authentication the corresponding PKI pair of keys. As the result of the mutual authentication cryptographically strongly protected secure-messaging keys are agreed between $ID_{OLD}$ and $ID_{NEW}$, as indicated by the double arrow P5 in FIG. 1. These keys are known only to the new passport 1 and the old passport 2 and by no means to the PC 3. In this fashion thus a secured end-to-end connection is ensured between the two passports 1 and 2, to which third parties, and in particular not the PC interposed during the communication, do not have access.

Via the secured end-to-end connection finally the activation of the new passport 1 takes place in that by the old passport 2 activation data, in particular personalization data (e.g. biometric data), cryptographic keys and the like, are transferred to the new passport 1. For this purpose the command APDUs (READ BINARY) are generated by the interposed host 3. Since the host does not have the corresponding secure-messaging keys, it can have the commands for the old passport 2 generated in the correct secure-messaging format with the aid of the commands PSO: ENCIPHER and PSO: COMPUTE CC that are supplied by the new passport 1. The old passport 2 then sends as response the encrypted and integrity-protected data via the secured end-to-end connection. The host 3 does at no time receive or see the data in plain text. The data are embedded in an UPDATE BINARY command that is then sent to the new passport 1 for setting the data. So as to prevent a repeated loading of the same data, preferably a corresponding send-sequence counter (SSC) is maintained by the commands PSO: ENCIPHER and PSO: COMPUTE CC. Within the framework of activation all authorizations and functionalities present on the old passport 2 are transferred from said passport to the new passport 1. After the concluded activation the new passport 1 is immediately ready for use and can be used with all functionalities. It is not necessary to additionally contact the producer or a central authority.

The embodiment of the method according to the invention described above has a number of advantages. by a corresponding linking between the identity $ID_{OLD}$ of the old passport and the identity $ID_{NEW}$ of the new passport during the request phase of the new passport and the mutual authentication of the passports upon activation of the new passport it is prevented on the one hand that an electronic document which does not result from the process of requesting the new passport (e.g. a forgery) can be activated or personalized with the identity of the old passport. Likewise the new passport with its identity $ID_{NEW}$ cannot be activated or personalized with a different document that has an identity other than the identity $ID_{OLD}$, e.g. with a manipulated or forged document.

Since the logic connection between the identity $ID_{OLD}$ of the old passport 2 and the identity $ID_{NEW}$ of the new passport 1 is based on keys agreed directly between the passports, it is impossible for an attacker to decrypt this communication. Manipulations of the transferred data are recognized by the integrity protection and the use of manipulated data is prevented in this fashion. Moreover, through the above-described continuous send-sequence counter it is ensured that a repeated loading of activation data within the same personalization session is prevented. In this fashion a corresponding manipulation through an attacker can be recognized.

The above-described embodiment of the method according to the invention was described using the example of requesting a new electronic passport that can be activated by a user with the aid of the old passport. However, the method can be applied to any desired other portable data carriers in the sense described at the outset, for example other identification documents or visa.

In particular when the method is employed for identification documents, expediently a variant of the method according to the invention is employed, in which the data on the old document 2 are deleted or made unusable after the corresponding activation of the new document 1, so that the old document 2 becomes invalid. In this fashion it can be ensured that despite an online request and a decentral activation of the new identification document 1 always exactly only one document is valid and thus in particular biometric data cannot be exchanged and manipulated. The concept of deleting the data on the old document 2 or making them unusable can of course also be applied to other types of documents or portable data carriers.

In the method according to the invention it is further not necessarily required that the new data carrier 1 to be activated is already personalized in advance. Rather the personalization of the new data carrier 1 can also take place exclusively via an end-to-end connection between the old and the new data carrier, so that in the production of the new data carrier 1 prefabricated, generic blanks can be used that only have to be electronically prepared for activation. The actual individualization of the data carrier 1 then takes place after delivery to the user via the end-to-end connection.

The method according to the invention can, if required, also be used to secure the data of a data carrier on a backup data carrier. Here the user owns, in addition to the actual data carrier in use, also a further data carrier in the form of a backup of the actual data carrier. The backup data carrier here can be or be made functional either on its own or an independent functionality of the backup data carrier can be fundamentally ruled out. In the latter case the user can request a new data carrier with the method according to the invention and activate this new data carrier with the aid of the backup data carrier. Likewise the method according to the invention can be used to request a backup data carrier and to activate it with the data carrier in use, so that the user immediately has a replacement at his disposal in the case of loss or theft of the data carrier. In this variant it must be made sure that after activating the backup data carrier the old data carrier further remains functional.

The method according to the invention is not limited to the new, activated data carrier representing a replacement for the old data carrier. Rather, it is also possible that through the activation certain authentication data, such as e.g. keys, a client certificate for a client-server authentication and the like, are transferred from one data carrier to the other data carrier, without having to request an extra pair of keys or certificate for each new data carrier. It is thereby made possible to transfer authentication data securely from one data carrier to another.

Where applicable, also electronic documents of two different types can be involved in the method according to the invention. For example a user can make an online request for a visa with the aid of the passport, which visa is delivered to him subsequently and which he can activate with the aid of the passport used when making the request.

The invention claimed is:

1. A method for activating a first portable data carrier with the aid of a second portable data carrier, the method comprising the steps:

supplying the first portable data carrier to a user in an inactive state after the user has requested the first portable data carrier over a communication network from a central instance with the aid of the second portable data carrier, the inactive state being where intended use of the first portable data carrier is not possible, wherein the first portable data carrier is supplied to the user with first personalization data provided thereon, the first personalization data being data pertaining uniquely to the user, the first personalization data being provided on the first portable data carrier by the central instance;

setting up a direct communication connection between the first portable data carrier and the second portable data carrier, the direct communication connection being set up between the first portable data carrier and the second portable data carrier without an interposition of any device between the first portable data carrier and the second portable data carrier, wherein the first and the second portable data carriers mutually authenticate each other via the direct communication connection on the basis of authentication data and establish a cryptographically secured end-to-end connection, the authentication data being applied to the first portable data carrier which permit a mutual authentication directly and exclusively with the second portable data carrier by the direct communication connection; and activating the first portable data carrier, wherein the second portable data carrier transmits activation data to the first portable data carrier via the cryptographically secured end-to-end connection, the activation data including second personal identification data pertaining uniquely to the user, wherein, within the framework of activating the first portable data carrier, all authorizations and functionalities present on the second portable data carrier are transferred from the second portable data carrier to the first portable data carrier through the cryptographically secured end-to-end connection and the first portable data carrier is immediately ready for use and usable with all functionalities after the conclusion of the activation, wherein the first portable data carrier and the second portable data carrier are each configured to establish a communication with a terminal and to be powered at least partially by said terminal, wherein the first portable data carrier is a first electronic identity document, and the second portable data carrier is a second electronic identity document, and wherein the first personalization data includes an optical personalization pertaining uniquely to the user and provided on the first portable data carrier by the central instance.

2. The method according to claim 1, wherein at least one of the first and the second portable data carriers comprises at least one of: an electronic identification document, an electronic visa, an electronic ticket, an electronic health card and an electronic bank card.

3. The method according to claim 1, wherein the first portable data carrier is supplied on the basis of an online request by the user.

4. The method according to claim 1, wherein the first portable data carrier in the inactive state is already personalized at least partly optically and/or electronically.

5. The method according to claim 1, wherein the communication connection set up between the first and the second portable data carriers is a local communication connection in the area of influence of the user.

6. The method according to claim 1, wherein the mutual authentication is a symmetric authentication with a symmetric key.

7. The method according to claim 1, wherein the mutual authentication is an asymmetric authentication with an asymmetric pair of keys of a private and a public key.

8. The method according claim 1, wherein the setup of the communication connection is preceded by a user authentication.

9. The method according to claim 1, wherein the activation data comprise personalization data, to be stored on the first portable data carrier.

10. The method according to claim 1, wherein the activation data comprise at least one of several cryptographic keys and electronic certificates.

11. The method according to claim 1, wherein the activation data comprise a password to be input by the user.

12. The method according to claim 1, wherein after the activation of the first portable data carrier the second portable data carrier becomes inactive.

13. A system for activating a portable data carrier, the system comprising a first portable data carrier and a second portable data carrier, which are configured so as to enable the following steps to be carried out:

supplying the first portable data carrier to a user in an inactive state after the user has requested the first portable data carrier over a communication network from a central instance with the aid of the second portable data carrier, the inactive state being where intended use of the first portable data carrier is not possible, wherein the first portable data carrier is supplied to the user with first personalization data provided thereon, the first personalization data being data pertaining uniquely to the user, the first personalization data being provided on the first portable data carrier by the central instance;

setting up a direct communication connection between the first and the second portable data carriers, the direct communication connection being set up between the first portable data carrier and the second portable data carrier without an interposition of any device between the first portable data carrier and the second portable data carrier, wherein the first and the second portable data carriers mutually authenticate each other via the direct communication connection on the basis of the authentication data and establish a cryptographically secured end-to-end connection the authentication data being applied to the first portable data carrier which permit a mutual authentication directly and exclusively with the second portable data carrier by the direct communication connection; and activating the first portable data carrier, wherein the second portable data carrier transmits activation data to the first portable data carrier via the cryptographically secured end-to-end connection, the activation data including second personal identification data pertaining uniquely to the user, wherein, within the framework of activating the first portable data carrier, all authorizations and functionalities present on the second portable data carrier are transferred from the second portable data carrier to the first portable data carrier through the cryptographically secured end-to-end connection and the first portable data carrier is immediately ready for use and usable with all functionalities after the conclusion of the activation, wherein the first portable data carrier and the second portable data carrier are each configured to establish a communication with a terminal and to be powered at least partially by said terminal, wherein the first portable data carrier is a first electronic identity document, and the second portable data carrier is a second electronic identity document, and wherein the first personalization data includes an optical personalization pertaining uniquely to the user and provided on the first portable data carrier by the central instance.

14. A method comprising:

requesting, by a user, a replacement portable data carrier over a communication network from a central instance to replace an original portable data carrier, wherein the replacement portable data carrier is requested from the central instance with the aid of the second portable data carrier;

producing, by the central instance, the replacement portable data carrier so that the replacement portable data carrier includes authentication data configured to permit a mutual authentication directly and exclusively with the original portable data carrier, wherein the replacement portable data carrier is produced to include first personalization data provided thereon, the first personalization data being data pertaining uniquely to the user, the first personalization data being provided on the first portable data carrier by the central instance;

placing, by the central instance, the replacement portable data carrier in an inactive state in which an intended use of the replacement portable data carrier is not possible until the replacement portable data carrier is activated;

delivering the inactive replacement portable data carrier to the user;

setting up a direct communication connection between the original portable data carrier and the inactive replacement portable data carrier, the direct communication connection being set up between the original portable data carrier and the replacement portable data carrier without an interposition of any device between the original portable data carrier and the replacement portable data carrier, by which the original and replacement portable data carriers mutually authenticate each other via the direct communication connection on the basis of the authentication data and establish a cryptographically secured end-to-end connection through the direct communication connection;

activating the replacement portable data carrier by transmitting activation data from the original portable data carrier to the inactive replacement portable data carrier via the cryptographically secured end-to-end connection to activate the replacement portable data carrier, the activation data including all authorizations and functionalities that allow the replacement portable data carrier to replace the original portable data carrier, the activation data including second personal identification data pertaining uniquely to the user, wherein the original portable data carrier and the replacement portable data carrier are each configured to establish a communication with a terminal and to be powered at least partially by said terminal, wherein the first portable data carrier is a first electronic identity document, and the second portable data carrier is a second electronic identity document, and wherein the first personalization data includes an optical personalization pertaining uniquely to the user and provided on the first portable data carrier by the central instance.

15. The method according to claim 14, wherein requesting the replacement portable data carrier from the central instance is performed online.

16. The method according to claim 14, wherein the activation data transmitted from the original portable data carrier to the inactive replacement portable data carrier comprises personalization data of the user.

17. The method according to claim 16, wherein the first or the second personalization data comprises biometric data.

18. The method according to claim 16, wherein the replacement portable data carrier is one of: an electronic identification document, an electronic visa, an electronic passport, an electronic ticket, an electronic health card, and an electronic bank card.

19. The method according to claim 16, wherein the communication connection set up between the replacement and original portable data carriers is a local communication connection in the area of influence of the user.

20. The method according to claim 16, wherein after activation of the replacement portable data carrier the original portable data carrier becomes inactive.

* * * * *